United States Patent [19]

Ernst

[11] 4,276,696

[45] Jul. 7, 1981

[54] PRECISION LENGTH MEASURING INSTRUMENT

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 95,299

[22] Filed: Nov. 19, 1979

[30] Foreign Application Priority Data

Nov. 24, 1978 [DE]  Fed. Rep. of Germany ....... 2850875

[51] Int. Cl.³ ................................................ G01B 7/02
[52] U.S. Cl. ................................. 33/169 R; 33/125 C
[58] Field of Search ..................... 33/169 R, 170, 171, 33/172 R, 172 E, 174 L, 125 R, 125 C

[56] References Cited

U.S. PATENT DOCUMENTS

| 2,627,119 | 2/1953 | Grahan | 33/172 E |
| 3,939,569 | 2/1976 | Squires | 33/174 L |

FOREIGN PATENT DOCUMENTS

| 1216553 | 5/1966 | Fed. Rep. of Germany. |
| 1623337 | 2/1971 | Fed. Rep. of Germany. |
| 2631233 | 4/1978 | Fed. Rep. of Germany. |
| 2356030 | 5/1978 | Fed. Rep. of Germany. |

OTHER PUBLICATIONS

Journal of the Optical Society of America, "Development of the Ruling Art", vol. 39, #6, 6/49, pp. 413, 422.

Primary Examiner—Harry N. Haroian
Attorney, Agent, or Firm—Hume, Clement, Brinks, Willian & Olds, Ltd.

[57] ABSTRACT

An improved height measuring instrument includes a hollow profile support member measuring a scale mounted to the support member, and a relatively flexible guide member which is adjustably mounted to the support member by means of a plurality of threaded fasteners which can be used to push or pull the guide member to correct measurement errors. A measurement carriage is guided along the guide member. This carriage bears an intermediate member onto which is mounted both a sensor and a reading unit arranged to scan the scale. A spring parallelogram including a pair of opposed, parallel plate springs connects the intermediate member to the carriage to provide a substantially constant measuring force. An apparatus is disclosed for altering the spring constant of the parallelogram to compensate for the proper weight of the intermediate member, the reading unit, and the sensor. This apparatus includes two knife edges mounted on the intermediate member and a cylinder, spring mounted on the carriage and biased into contact with the knife edges.

6 Claims, 6 Drawing Figures

PRECISION LENGTH MEASURING INSTRUMENT

BACKGROUND OF THE INVENTION

This invention relates to an improvement in precision length measurement instruments of the type which include a scale, a reading unit moveable along the scale, and a sensor, coupled to the reading unit, for making contact with a surface to be measured.

A large number of references are concerned with length measurement instruments and their errors, specifically with the reduction of these errors. Several specific problems of this area of technology are treated in the descriptive introduction to West German DE-OS No. 16 23 337. Thus, it is desirable that measurement instruments retain the comparator principle, because in an instrument which employs the comparative Abbé principle errors of the first instance are avoided. In some measurement instruments, however, this principle cannot be employed for various technical reasons and thus other arrangements have been developed which employ other measures (such as the Eppenstein principle and the object of the application of DE-OS No. 16 23 337) to eliminate as much as possible the so-called comparison errors.

Furthermore, measurement instruments are known which include spring mounted measurement sensors. The deviation of the measurement sensor from its zero position determines the actual measurement, and the measurement value is given a figure that corresponds to the measurement sensor deviation. Such an instrument is the object of West German DE-PS No. 23 56 030 and is described in the descriptive introduction of that patent.

Such instruments, however, often require relatively complex structures which are not easily operated. Therefore, capital expenditures for this type of instrument tend to be relatively high and such instruments generally require specially qualified personnel to operate them.

For example, in height measurement instruments the Abbé principle generally cannot be used. Because geometrical considerations often dictate a comparator distance of 50 to 100 mm, one must, for example, maintain a guide precision of ±2 arc seconds in order to have a measurement precision of ±1 micron. In order to keep manufacturing costs at a practical level the use of light metal profiles seems indicated but their straightness, however, remains substantially under the above mentioned value.

The requirement for high measurement precision also means that the measurement carriage must be moved with little friction. In this way measurement forces can be maintained constant within narrow limits in order to avoid deformations of the measurement sensor caused by variations in measuring forces. Roller bearings, generally used for low friction guides, are often not sufficiently precise as a result of the inevitable construction tolerances and the gradual deposition of foreign material on the guide surfaces.

SUMMARY OF THE INVENTION

The present invention is directed to a structurally simple and therefore relatively low cost length measurement instrument that provides high measurement precision and which is simple to operate.

According to this invention an instrument is provided as defined in claim 1. The dependent claims set forth characteristics that advantageously expand the invention.

According to a first feature of the invention, a measuring instrument is provided with a measurement sensor and a reading unit mounted on an intermediate member. This intermediate member is in turn mounted to move in a substantially friction free manner with respect to a measurement carriage which travels along the measurement direction. The mounting means for the intermediate member preferably includes a spring parallelogram to provide a substantially constant measuring force.

According to a second feature of the invention a measuring instrument is provided with a support member (such as a hollow profile); a guide member (such as a cylindrical rod) mounted in the support member; and means for precisely adjusting the position of the guide member with respect to the support member. By proper adjustment, the guide member can be positioned to compensate for errors due to the scale, deformations in the support member or the guide member, or other causes.

According to a third feature of the invention, a spring parallelogram is provided with means for altering its spring constant. Here, the parallelogram comprises two opposed members connected by means of a pair of opposed, substantially parallel spring members. The means for altering the spring constant includes a pair of knife edges mounted on the first opposed member, and a cylinder mounted on the second opposed member and biased into contact with the two knife edges.

The invention, together with further objects and attendant advantages, will be best understood by reference to the following detailed description taken in connection with the accompanying drawings.

DETAILED DESCRIPTION OF PREFERRED EMBODIMENT

Figure 1:
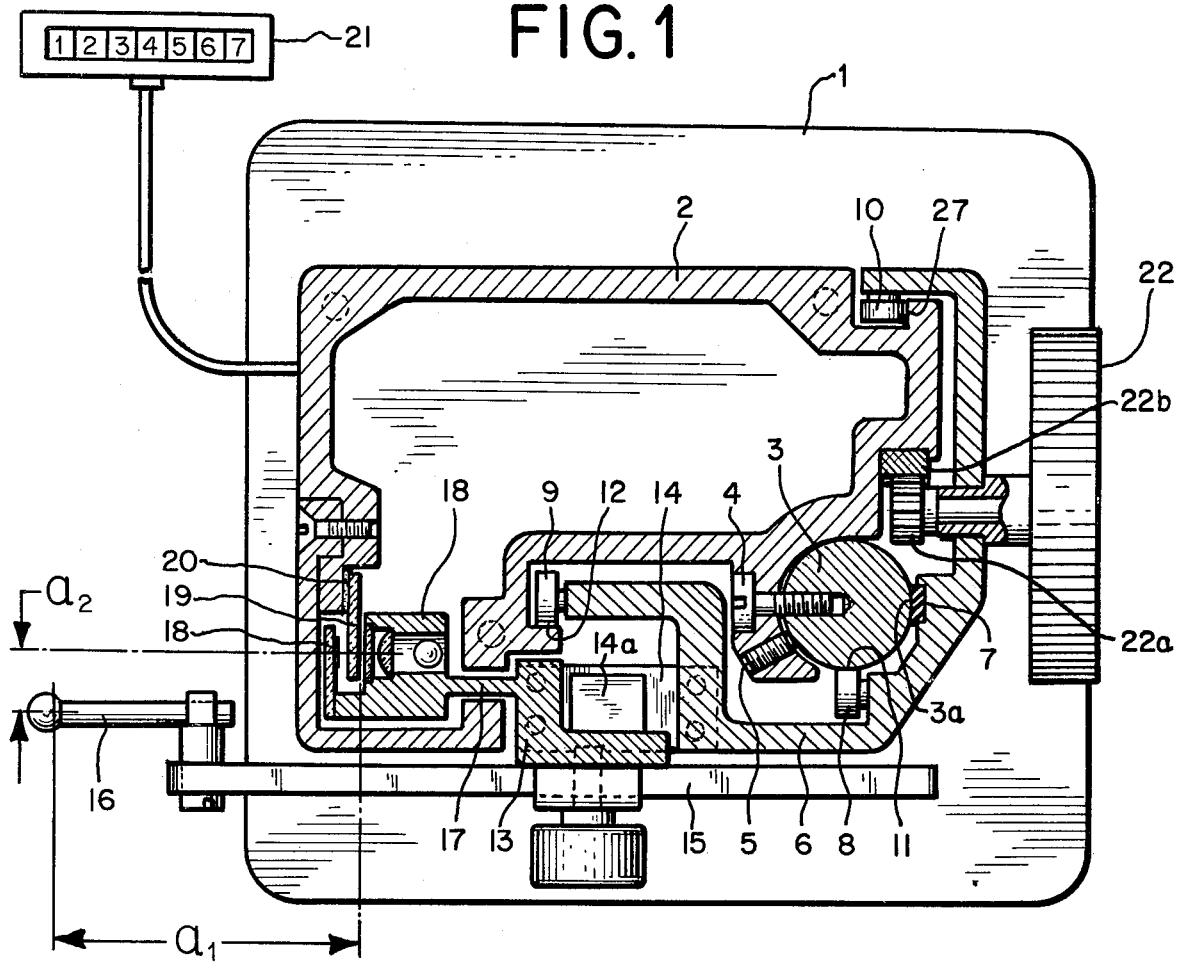
FIG. 1 is a cross-sectional view of a first preferred embodiment of the length measurement instrument of this invention taken along line 1—1 of FIG. 2.

Referring now to the drawings, FIG. 1 shows a base plate 1 on which has been installed a hollow profile 2 at right angles to the base plate 1. This hollow profile 2 is preferably a light metal extrusion and is very resistant to bending forces. A comparatively flexible rod 3, which preferably consists of a commercially available polished, round steel bar, is installed in the hollow profile 2 by means of a number of pull and/or pressure screws 4, 5. A linear strip 3a of the surface of the rod 3 is aligned by means of the pull and/or pressure screws 4, 5 and serves as the primary guide surface for a moveable measurement carriage 6. The measurement carriage 6 is provided with two glide shoes 7 which slide along the guide surface 3a of the rod 3. The glide shoes 7 are preferably made out of self-lubricating, wear-resistant material such as a synthetic material, sintered bronze, or the like. Through the sliding action of the shoes 7 on the guide surface 3a, a self-cleaning action is provided. The measurement carriage 6 is also provided with support rollers 8, 9, 10 which support the measurement carriage 6 on side guide surfaces 11, 12, 27 which are not adjustable. The two glide shoes 7 glide on the guide surface 3a of the rod 3 and provide a very high guide precision in the plane in which the greater comparator distance $a_1$ is absolutely necessary. In spite of the relatively lower guide precision of the roller bearings 8, 9, 10, only a negligibly small error occurs in the second plane, because comparator distance $a_2$ is kept small or is indeed reduced to zero.

An intermediate member 13 is connected to the measurement carriage 6 by means of a pair of plate springs 14 which provide a friction-free connection. The plate springs 14 are substantially parallel such that a parallelogram is defined by the ends of springs 14. These springs 14 flex to allow the intermediate member 13 to translate with respect to the carriage 6 along the measurement direction in a low friction manner. The springs 14 also substantially prevent rotation between the intermediate member 13 and the carriage 6. Mounted to this intermediate member 13 is a scanner arm 15 on whose free end is located a measurement sensor 16. A narrow blade section 17 is formed on the intermediate member 13, and a scanning unit 18 of a photoelectrical measurement unit is mounted on the free end of this blade section 17. This scanning unit 18 scans an incremental division formed on a scale 19 which is protectively mounted within the hollow profile 2 in a known manner by means of a resilient intermediate layer 20. The scanning unit 18 generates measurement signals which are processed in a known manner by an electronic evaluation and display unit 21 and are indicated or printed out as a measurement value.

The measurement carriage 6 also includes a drive mechanism which includes a hand wheel 22 and a pinion gear 22a. The pinion gear 22a meshes with a rack 22b mounted on the profile 2. The pinion gear 22a is positioned such that the distance between the attack point of the drive force and the plane in which the friction affected guide is located is small. In this way an almost shock-free movement of the measurement carriage 6 is made possible.

The handwheel 22 is used for positioning the measurement carriage in order to measure a workpiece or to calibrate the instrument, as in setting the zero point of the measurement instrument. To facilitate individual measurements, both the scanner arm 15 and the measurement sensor 16 can be adjusted as necessary by means of known elements. In that the scanner arm 15 is mounted both to slide and to rotate, the measurement instrument can be readily adapted to different measuring tasks and different measuring geometries. In general, when the arm 15 is positioned for minimum length the greatest precision is attained, because the comparator distance is then as small as possible. When a longer arm extension with a somewhat lower precision is chosen, difficult to reach surfaces of a workpiece can be measured.

Figure 2:
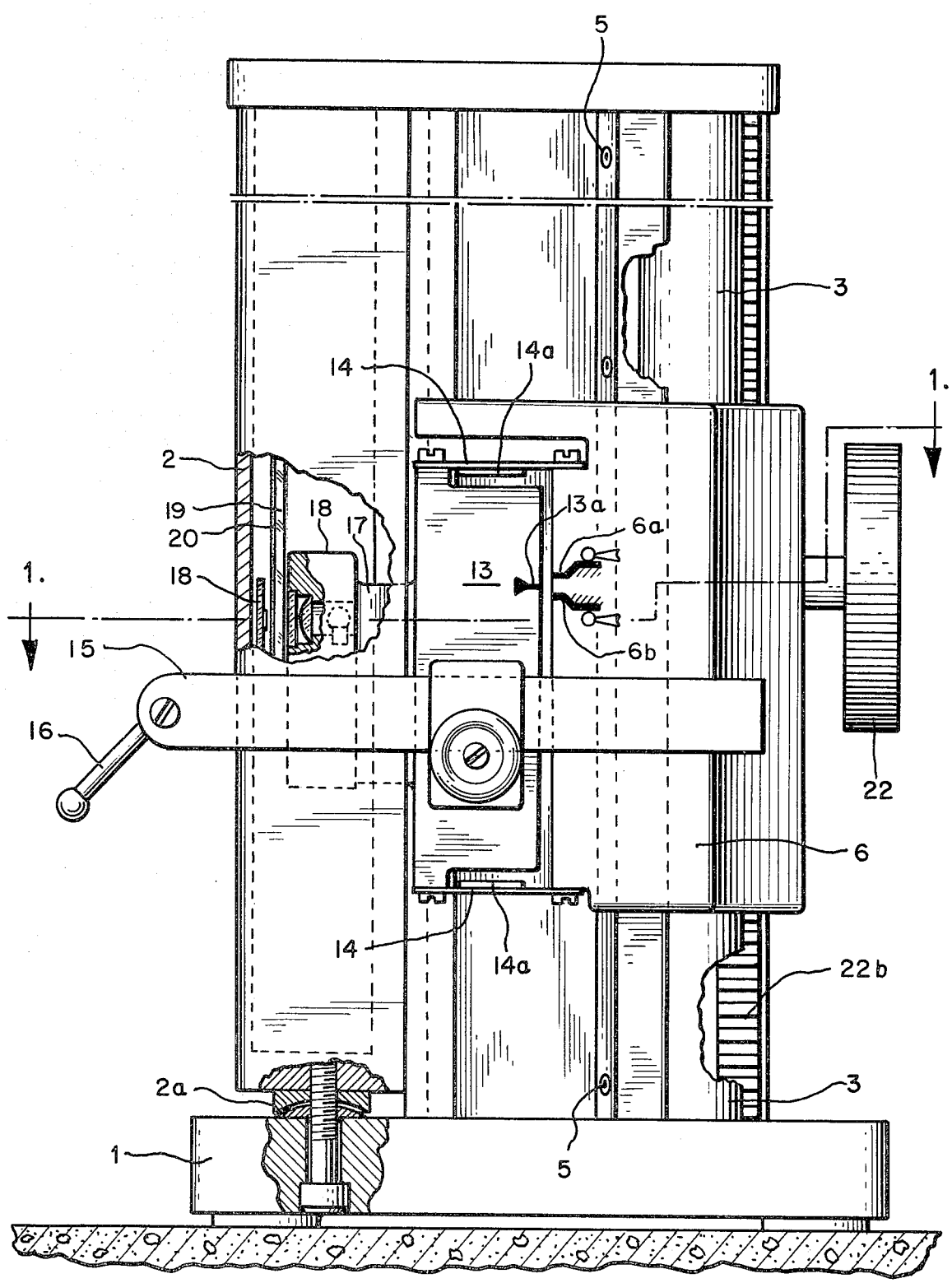
FIG. 2 is a sideview of the length measurement instrument of FIG. 1.

The markings 6a, 6b and 13a that are visible in FIG. 2 serve for the approximate indication of the attainment of a measuring position. The intermediate member 13, which is mounted to move in a friction-free manner on the plate springs 14, carries an index 13a. The measurement carriage 6 also carries two measurement indices 6a and 6b, used as index points in the scanning of a workpiece located beneath and above the sensor, respectively. The force of the plate springs 14 maintains the intermediate member 13 in a neutral position so that the index 13a assumes its rest position somewhat in the middle, between the two indices 6a and 6b. During the measurement of a workpiece the measurement carriage 6 must be moved by the drive 22 so far that the index 13a approximately coincides with the appropriate one of the two indices 6a, 6b. Approximate coincidence between index 13a with either index 6a or index 6b is sufficient to provide precise measurement results. An exact coincidence is not required because the measurement sensor 16 is pressed against the workpiece with a substantially constant force within the area determined by the characteristic curve of the springs 14, and therefore the position of the sensor 16 is substantially independent of minor differences in the position of the carriage 6. Similarly, the intermediate member 13—which carries the reading unit 18 on the blade 17—maintains a substantially constant position within the area that is determined by the characteristic curve of springs 14, as presented in FIGS. 5 and 6. Accordingly, the position of the reading unit 18 with regards to the scale 19 is substantially independent of minor differences in the position of the carriage 6, and the measurement result is therefore unequivocal and constant.

The measurement precision obtainable with this embodiment of the suspension (springs 14) is substantially independent of the precision with which the measurement carriage 6 is adjusted with regard to the markings 6a or 6b. In addition, stiffening elements 14a are provided on each of the plate springs 14 which increase the rigidity of the parallelogram of the springs 14. See FIG. 2.

Figure 5:
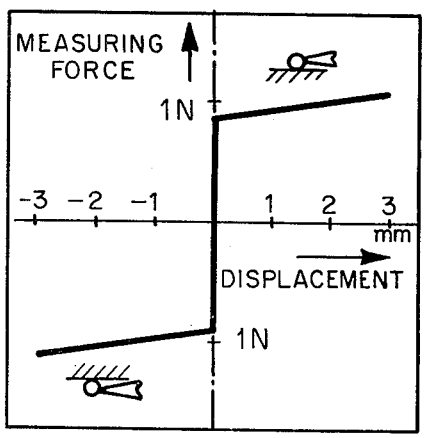
FIG. 5 is a force diagram of the embodiment of FIG. 4.
Figure 6:
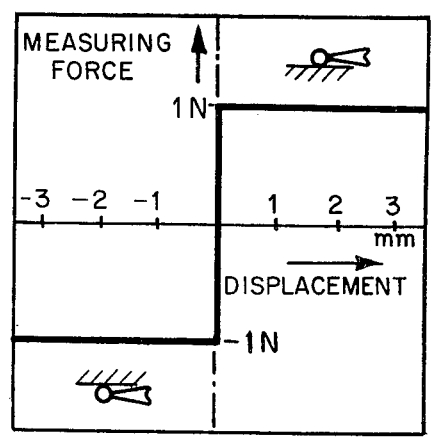
FIG. 6 is another force diagram.
Figure 4:
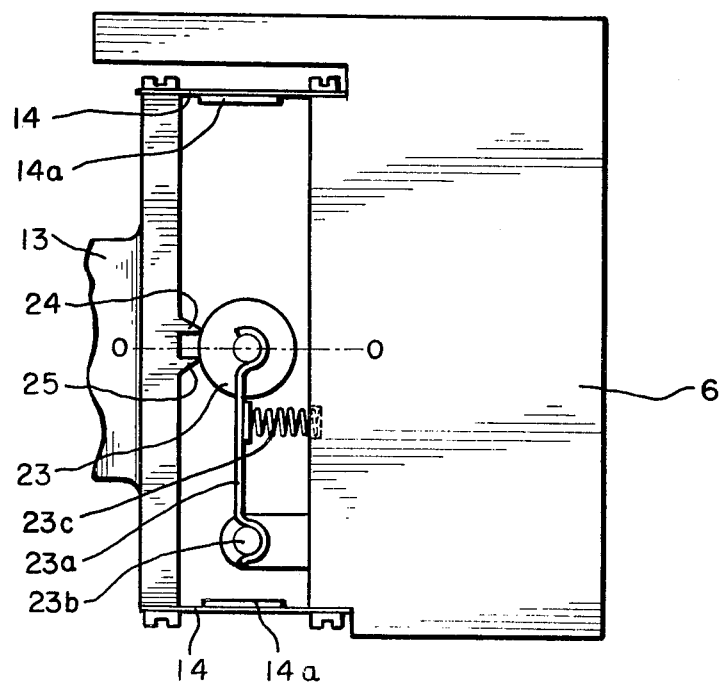
FIG. 4 is a partial sectional view of a third preferred embodiment including an arrangement for altering the spring characteristic curve.

Preferably the spring force of the plate springs 14, the rigidity of the spring parallelogram, and the wheel half-diameter of the wheel 23 (FIG. 4), are chosen to obtain the characteristic lines shown in FIGS. 5 and 6. A mechanism is shown in FIG. 4 which can be used to compensate for the proper weight of the moveable components 13, 15, 16, 17, 18. This mechanism includes a wheel 23 which is spring loaded by lever 23a which is pivotably mounted at pivot 23b mounted on the carriage 6. The lever 23a is spring biased away from the carriage 6 by a spring 23c so that the periphery of the wheel 23 is urged into contact with two knife edges 24, 25. These knife edges 24, 25 are mounted on the intermediate member 13 assymetrically with respect to the wheel 23, as shown, such that the lower knife edge 25 contacts the wheel 23 nearer the center line of the wheel 23 than does the upper knife edge 24. In alternate embodiments, the knife edges may be adjustably mounted on the intermediate member 13.

The intermediate member 13 of FIG. 4 is mounted to the carriage 6 by means of a friction free suspension which includes two plate springs 14. This arrangement ensures that the measurement sensor 16 is pressed against the workpiece with approximately the same measuring force whether an upper or a lower surface of a workpiece is being measured. To a large degree this measuring force is independent of the precise position of the intermediate member 13 with respect to the measurement carriage 6. That is, measuring force is substantially independent of the deviation of the plate spring parallelogram.

A further feature which contributes to the high measurement precision of the embodiment of FIGS. 1 and 2, as well as to its ease of operation, is the exact weight balance of the components mounted on the moveable measurement carriage. Both the measurement carriage 6 as well as the intermediate member 13, with the scanner arm 15 and the measurement sensor 16, have been dimensioned with regards to their own weight in such a manner that even a small amount of friction of the glide shoes 7 on the guide surface 3a results in a jamming of the measurement carriage 6 in any position if the friction at the adjustment of the measurement carriage 6 is found to be excessive. In order to obtain this positive jamming effect, two of the guide points of the carriage 6 are provided with glide shoes—these are sufficient without anything further for a high precision guiding.

Figure 3:
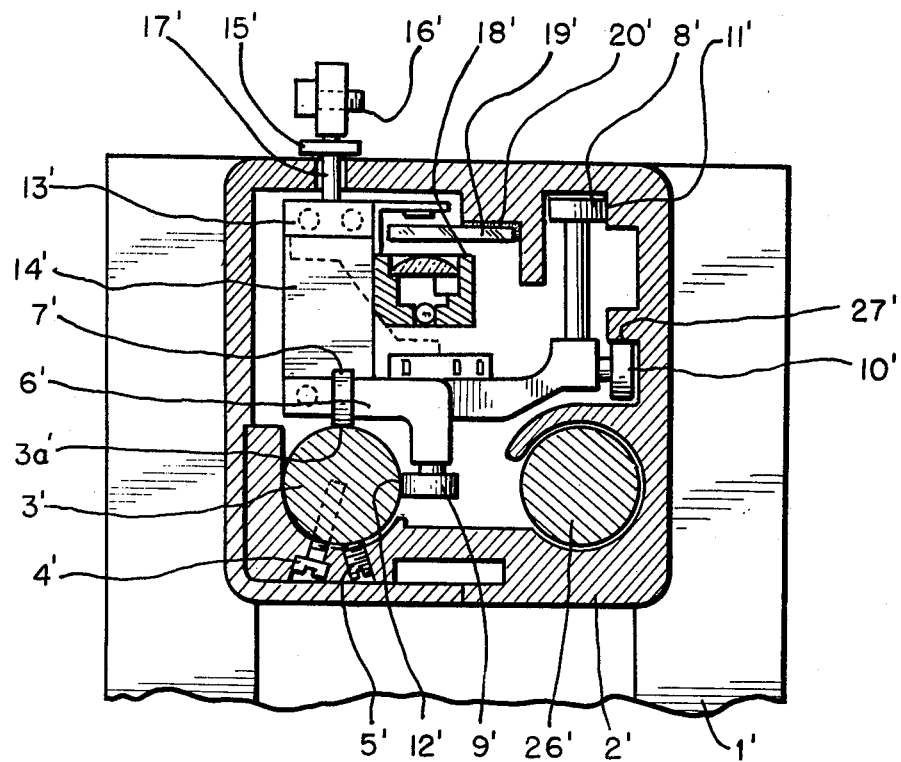
FIG. 3 is a cross-sectional view of a second preferred embodiment.

FIG. 3 shows a cross-section of a measurement instrument which provides a somewhat reduced degree of precision as compared to the embodiment of FIGS. 1 and 2. In this embodiment a measurement carriage 6' is located within the inside of a hollow profile 2'. Here, as before, a round rod 3' serves as guide. Pull and/or pressure screws 4', 5' fulfill the same purpose as the elements 4 and 5 in FIG. 1. In addition to equivalent elements such as the intermediate member 13', plate springs 14', stiffeners 14a', scanner arm 15', measurement sensor 16', blade 17', reading unit 18', scale 19' and resilient bonding layer 20', the measurement carriage 6' includes a counterweight 26'. The counterweight 26' moves in opposition to the carriage 6'. The weight 26' and the carriage 6' are connected by cables (not shown) connected therebetween. These cables extend away from the carriage 6', over pulley arrangements (not shown) near the top and bottom of the profile 2', to the counterweight 26'. Both the counterweight 26' and the carriage 6' are free to move along the length of the profile 2', and the weight of the counterweight 26' is chosen such that the carriage 6' will remain at rest at any desired point along the length of the profile 2'. In this embodiment the carriage 6' is guided by precision roller bearings 7' which do not provide the automatic jamming function of the slide shoes 7. In addition, in this embodiment, a motor is provided as the drive for the measurement carriage adjustment.

An additional feature of both embodiments, which represents an advance in the art, is the adjustable mounting of the guide surface 3a, 3a' in the profile 2, 2'. In the past, high precision measurement has been long thought to require the highest possible precision in the guidance of moveable measurement elements. High guidance precision may drive up the costs of a measurement instrument into a range that often can not be justified for workplace measurement instruments.

In providing high precision guidance, however, the errors of the actual measurement scale have often been only marginally considered. In measurement instruments in accordance with the present invention, practically the sole source of error is the comparator error. These errors cannot be completely eliminated through improved guiding precision.

The present invention includes novel adjustment means for the guide surface 3a, 3a' which make it possible to correct most or all measurement errors, be they guidance errors, system errors of the measurement scale, or specific comparator errors. This is done by calibrating the measurement instrument by precise measurement of known distances. Overall system errors are thereby determined as a function of measurement position, and these errors are then corrected by appropriately shaping the guide surface 3a, 3a' by means of the pull and/or pressure screws 4, 5, 4', 5'. These screws 4, 5, 4', 5' are designed in such a manner that the round rod 3, 3' and with it the guide surface 3a, 3a' can be deformed by means of the screws 4, 5, 4', 5' in such a manner that the errors of the measurement instrument are corrected.

The bottom plate 1, 1' of the described measurement instrument is preferably supported by three adjustable feet which are covered with abrasive resistant material and include a filler material such as high pressure-E-module reinforced synthetic material. These feet are mounted to the plate 1, 1' by means of adjustment screws which pass through ball joints. These ball joints adjust to the mounting surface while providing rigid support to the instrument.

In summary, the present invention provides a measurement sensor 16 coupled to an intermediate member 13 which moves in a friction-free manner with respect to a measurement carriage 6. This measurement carriage 6 is guided with sufficient precision by a guide surface 3a so that the comparator errors remain acceptably small. The guide of the measurement carriage 6 includes two simple profiles 2 and 3 that are braced with regards to each other and can thus be adjusted. The measurement carriage 6 must only be approximately placed in the measurement position, and then the measurement sensor 16 is pressed with a substantially constant measuring force against the surface to be measured. The measurement value is then read directly.

Of course, it should be understood that various changes and modifications to the preferred embodiments described herein will be apparent to those skilled in the art. Such changes and modifications can be made without departing from the spirit and scope of the present invention, and without diminishing attendant advantages. It is, therefore, intended that such changes and modifications be covered by the following claims.

I claim:

1. In a precision length measuring instrument including a bending resistant support member, a guide member mounted to the support member, a measuring scale, a measurement carriage, and means for guiding the measurement carriage along the guide member, the improvement comprising:

means for precisely adjusting the position of the guide member with respect to the support member at a plurality of positions along the length of the guide member, such that a first guide surface, defined by the guide member, is adjustable to a desired configuration;

means, included in the guide means, for precisely guiding the carriage along the first guide surface;

an intermediate member;

a measurement sensor, mounted on the intermediate member;

a reading unit, mounted on the intermediate member to scan the scale; and means for mounting the intermediate member to the carriage to move in a substantially friction free manner with respect to the carriage.

2. The improvement of claim 1 wherein the adjusting means includes a plurality of screws mounted to apply positioning forces between the guide member and the support member.

3. The improvement of claim 1 wherein the means for guiding the carriage along the first guide surface includes at least one glide shoe formed from a self-lubricating bearing material, said glide shoe mounted to the carriage to glide along the first guide surface such that the carriage is self locking.

4. The improvement of claim 1 wherein the means for guiding the carriage along the first guide surface includes at least one roller bearing mounted to the carriage to contact the first guide surface, and further, wherein a counterweight is coupled to the carriage.

5. The improvement of claim 1 wherein the mounting means comprises:

first and second substantially parallel spring members mounted between the intermediate member and the carriage to form a spring parallelogram having a stable rest position;

a pair of protruding members mounted on one of the intermediate member and the carriage;

a cylinder; and means for mounting the cylinder on the other of the intermediate member and the carriage and for biasing the cylinder into contact with the protruding members;

the spacing of the protruding members, the diameter of the cylinder and the contact force between the cylinder and the protruding members selected such that the mounting means generates a substantially constant restoring force tending to restore the spring parallelogram to the rest position when the spring parallelogram is deflected from the rest position in either direction.

6. The improvement of claim 5 wherein the mounting means further comprises means for adjusting the position of the protruding members with respect to said one of the intermediate member and the carriage.

* * * * *